United States Patent [19]

Jarvis

[11] 4,408,667
[45] Oct. 11, 1983

[54] AGRICULTURAL SHARES

[76] Inventor: Henry F. Jarvis, 21 Fermaner St., Karrinyup, Western Australia, Australia

[21] Appl. No.: 267,807

[22] Filed: May 28, 1981

[30] Foreign Application Priority Data

Jun. 20, 1980 [AU] Australia ............................. PE4344
Dec. 23, 1980 [AU] Australia ............................. PE7046

[51] Int. Cl.³ ...................... A01B 23/00; A01B 39/22
[52] U.S. Cl. ................................... 172/722; 172/719; 172/730; 172/745
[58] Field of Search ............... 172/745, 732, 730, 772, 172/719, 724, 725, 752, 766, 758, 722

[56] References Cited

U.S. PATENT DOCUMENTS

| | | | |
|---|---|---|---|
| 147,633 | 2/1874 | Haiman | 172/730 |
| 1,084,153 | 1/1914 | Lauer | 172/724 |
| 1,205,416 | 11/1916 | Trout | 172/719 |
| 1,570,860 | 1/1926 | Powell | 172/758 |
| 2,020,841 | 11/1935 | Lier | 172/719 |
| 2,051,328 | 8/1936 | Christensen | 172/719 |
| 2,266,818 | 12/1941 | Seaholm | 172/722 |
| 2,337,777 | 12/1943 | Seaholm | 172/722 |
| 2,884,082 | 4/1959 | Osterhaus | 172/719 |

FOREIGN PATENT DOCUMENTS

| | | | |
|---|---|---|---|
| 2538 | of 1926 | Australia | 172/719 |
| 113645 | 8/1941 | Australia . | |
| 83131/75 | 7/1975 | Australia . | |
| 18559/76 | 10/1976 | Australia . | |
| 59407/80 | 6/1979 | Australia . | |
| 78134 | 1/1980 | Australia . | |
| D77907 | 3/1980 | Australia . | |
| D77908 | 3/1980 | Australia . | |
| 207603 | 2/1960 | Austria | 172/752 |
| 334052 | 10/1903 | France | 172/719 |
| 730884 | 6/1955 | United Kingdom | 172/724 |
| 372957 | 8/1973 | U.S.S.R. | 172/705 |

Primary Examiner—Richard J. Johnson
Attorney, Agent, or Firm—Harold W. Milton, Jr.

[57] ABSTRACT

The present invention relates to an agricultural share formed of metal and having a front and rear and two sides converging together to form a point, wherein there is bonded to the front of the share along at least part of each of its sides a lateral protective metal length. Preferably there is also provided a center protective metal length bonded to the front of the share substantially equidistant from the sides of the share. Agricultural shares are subjected to extensive wear in use. The metal lengths, which are preferably formed of harder metal than the metal of the share itself, increase the operating life of the agricultural share of the present invention.

8 Claims, 3 Drawing Figures

AGRICULTURAL SHARES

The present invention relates to agricultural shares. Agricultural shares such as scarifier shares, cultivator shares and combine seed drill shares are used on a large scale for cultivation of land. They are also known as agricultural points.

Agricultural shares are subject to extensive wear in use and this limits their useful operating life. The present invention provides a modification to agricultural shares in which the operating life thereof can be considerably extended.

In accordance with the present invention there is provided an agricultural share formed of metal and having a front and rear and two sides converging together to form a point, wherein there is bonded to the front of the share along each of its sides a lateral protective metal length, each said protective metal length preferably being formed of harder material than the material of the agricultural share.

Further, there is preferably provided a centre protective metal length bonded to the front of the agricultural share equidistant from the sides thereof. Typically, this protective metal length extends to the point of the share and is in alignment with a mounting aperture of the share used to mount it to an agricultural apparatus by means of a bolt. This metal length is also preferably formed of harder material than the material of the agricultural share.

In accordance with the present invention there is also provided an agricultural share formed of metal and having a front and rear and two sides converging together to form a point, wherein there is bonded to the front of the share a centre protective metal length equidistant from the sides thereof.

The metal lengths are conveniently welded to the agricultural share although any mounting means can be used.

The provision of the protective metal lengths on the agricultural share reduces the rate of wear of the share in use and increases its operating life.

The present invention will now be described, by way of example, with reference to the accompanying drawings, in which.

Figure 2:
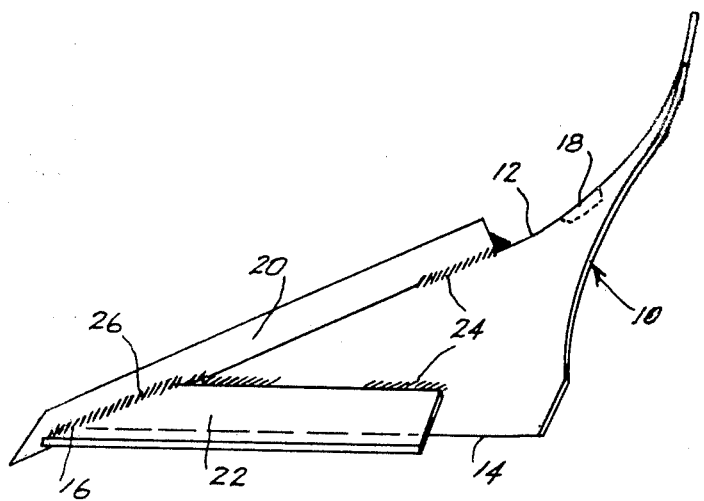
FIG. 2 is a side elevation of the share of FIG. 1.
Figure 3:
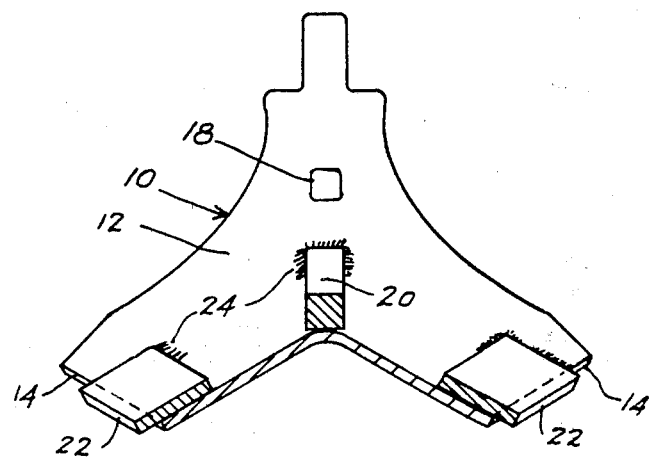
FIG. 3 is a sectional view of the agricultural share of FIG. 1 along the line A-A.

In the drawings, there is shown an agricultural share 10 comprising a front 12 and a rear which cannot be seen on the reverse side of the front 12. The share 10 further comprises a pair of sides 14 which converge together to form a point 16. Remote from but in alignment with the point 16 the share 10 has a square mounting aperture 18 through which in use a bolt is passed to affix the share 10 to an agricultural apparatus in known manner. As can be seen in FIGS. 2 and 3 the front 12 of the share 10 is humped with the crest of the hump running along a line from the mounting aperture 18 to the point 16. The front 12 falls away on either side of the hump down to the sides 14.

Figure 1:
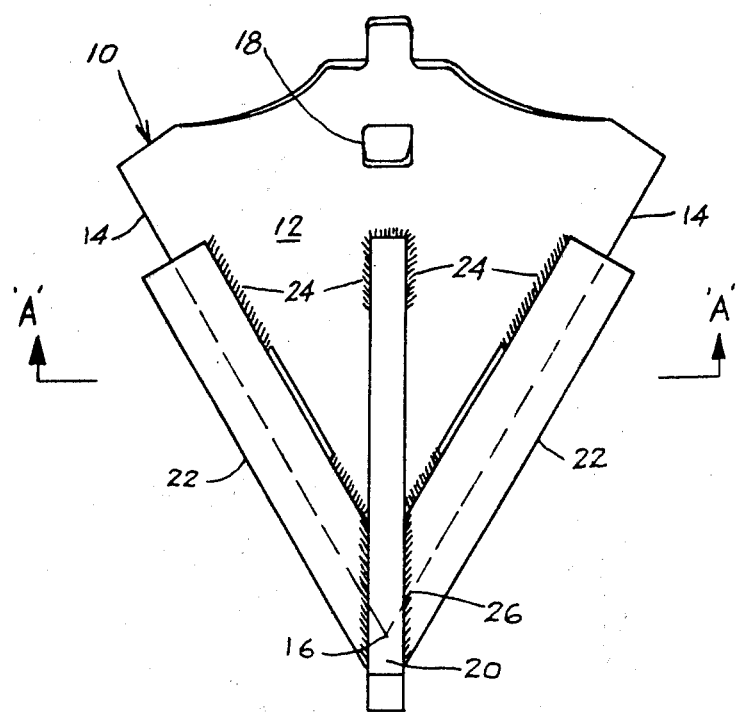
FIG. 1 is a front elevation of an agricultural share in accordance with the present invention.

In alignment with the aperture 18 and extending over the point 16, a protective centre metal length 20 is bonded to the front 12 of the share 10. As can be seen in FIG. 1, the centre metal length 20 is equidistant from the sides 14 along its entire length. As can be seen in FIG. 2, the metal length 20 extends downwardly past the point 16 so that the point 16 is fully protected in use. The metal length 20 could terminate flush with the point 16 but this would not protect the point 16 so effectively. A typical metal length 20 is generally square in cross-section with its sides having a similar dimension to its top and bottom. Further, the nose of the metal length 20 may be chamfered so that, in use, its upper leading edge is not dispersed forwardly of its lower leading edge. Along each side 14 of the share 10 there is bonded a further lateral protective metal length 22. As shown in the drawings, each metal length 22 overlaps the adjacent side 14 of the share 10 and projects downwardly beyond it to protect a respective side 14 in use. As shown in FIG. 3, the outer edges of the metal length 22 are substantially level with the sides 14 of the share 10. The metal lengths 22 could terminate flush with their respective sides 14 but this would not protect the sides 14 so effectively.

Each length of metal 22 may be rectangular in cross-section and have short sides and a large top and bottom area. The bottom area is that which is bonded to the front 12 of the share 10.

At their forward ends the metal lengths 22 are cut at an angle so as to abut the sides of the metal length 20 as can best be seen in FIG. 1. Further, the rear ends of the metal length 22 could be cut substantially parallel to the forward ends so as to be generally parallel to the direction of travel of the share 10 in use.

The protective metal lengths 20 and 22 are welded to the share 10 in the shaded regions indicated by the reference numeral 24. Further, the metal lengths 22 are welded to the metal length 20 where they abut in the shaded region indicated by the reference numeral 26.

The sizes and shapes of the metal lengths 20 and 22 are varied in use to suit different shares. Also, the amount of welding used varies to suit different shares.

Instead of being welded to the share 10 the metal lengths 20 and 22 could be bolted thereto.

Normally, the metal of the share 10 has a Rockwell C hardness of about 38 whereas the metal lengths 20 and 22 have a Rockwell C hardness of 65-70.

After the metal lengths 20 and 22 have been welded to the share 10 the adjacent regions of the share 10 and the metal lengths become locally heated. Therefore, the whole assembly is subsequently chilled to return the metal to its original hardness.

Modifications and variations such as would be apparent to a skilled addressee are deemed within the scope of the present invention. For example, the metal lengths 20 and 22 could be tapered from back to front. Since most wear takes place in the front region of the share it is possible to use less protective material towards the rear. However, for ease of manufacture it is preferred to use metal lengths with a uniform cross-section throughout.

I claim:

1. An unworn agricultural share formed of metal having a front and rear and two sides converging together to form a point and a mounting aperture located remote from the point, wherein a first, separate central protective metal length is secured by welding to the front of the share extending rearwardly from the point substantially equidistant from the sides of the point and in alignment with the mounting aperture, and second and third separate lateral protective metal lengths each have a forward end and inner and outer edges extending rearwardly from said forward end are secured by welding to the front of the share, wherein each said lateral protective metal length extends rearwardly from adjacent the point, the forward end of each lateral protective metal length is located adjacent to a side of the central protective metal length and is shaped so as to be substantially parallel with the adjacent side of the center protective metal length, the outer edge of each lateral protective metal length extends generally parallel to a respective side of the share and said outer edges of the lateral protective metal lengths are disposed at least as far outwardly as said respective sides of the share, the inner edge of each lateral protective metal length diverges away from an intermediate point on a side of the central protective metal length such that there is a depression between the central protective metal length and the inner edge of each lateral protective metal length, and said center protective metal length is fixed in position such that its position cannot be adjusted without first breaking the weld by which it is secured to the front of the share.

2. An agricultural share according to claim 1, wherein the center protective metal length extends forwardly of the point of the share.

3. An agricultural share according to claim 2, in which the foremost point of the center protective metal length is chamfered such that, in use, an upper forward edge of the center metal length is not disposed forwardly of a lower forward edge.

4. An agricultural share according to claim 1, wherein each lateral protective metal length overlaps its respective side by extending laterally and outwardly therefrom.

5. An agricultural share according to claim 4, wherein outer edges of the lateral metal lengths are substantially level with their respective sides.

6. An agricultural share according to claim 1, in which forward ends of the lateral protective metal lengths are so shaped and located as to abut the center protective metal length.

7. An agricultural share according to claim 1, in which the forward ends of the lateral protective metal lengths are welded to the center protective metal length.

8. An agricultural share according to claim 1, wherein the protective metal lengths are formed of harder material than the metal of the share itself.

* * * * *